United States Patent
Klische

(10) Patent No.: US 10,386,848 B2
(45) Date of Patent: Aug. 20, 2019

(54) IDENTIFYING A SENSOR IN AN AUTOPILOT VEHICLE

(71) Applicant: BlackBerry Limited, Waterloo (CA)

(72) Inventor: Marcus Klische, Dorfen (DE)

(73) Assignee: BlackBerry Limited, Waterloo, Ontario (CA)

( * ) Notice: Subject to any disclaimer, the term of this patent is extended or adjusted under 35 U.S.C. 154(b) by 226 days.

(21) Appl. No.: 15/445,446

(22) Filed: Feb. 28, 2017

(65) Prior Publication Data

US 2018/0246519 A1    Aug. 30, 2018

(51) Int. Cl.
| | |
|---|---|
| *G05D 1/02* | (2006.01) |
| *G06K 9/00* | (2006.01) |
| *B60R 11/04* | (2006.01) |
| *G06K 19/06* | (2006.01) |
| *G06K 7/14* | (2006.01) |
| *G05D 1/00* | (2006.01) |

(52) U.S. Cl.
CPC ............ *G05D 1/0246* (2013.01); *B60R 11/04* (2013.01); *G05D 1/0055* (2013.01); *G05D 1/0061* (2013.01); *G06K 7/1404* (2013.01); *G06K 9/00744* (2013.01); *G06K 9/00791* (2013.01); *G06K 19/06009* (2013.01)

(58) Field of Classification Search
CPC .. G05D 1/0246; G05D 1/0055; G05D 1/0061; B60R 11/04; G06K 7/1404; G06K 9/00744; G06K 9/00791; G06K 19/06009
See application file for complete search history.

(56) References Cited

U.S. PATENT DOCUMENTS

| | | | | |
|---|---|---|---|---|
| 5,732,303 A | * | 3/1998 | Choi | G03B 7/20 396/505 |
| 6,365,074 B1 | * | 4/2002 | Su | B29C 37/0025 264/1.7 |
| 6,671,039 B2 | * | 12/2003 | Yoda | G01M 11/0207 356/124 |
| 2002/0146161 A1 | * | 10/2002 | Suzuki | G01N 21/6456 382/141 |
| 2004/0013423 A1 | * | 1/2004 | Wells | G03B 13/08 396/296 |
| 2004/0252193 A1 | * | 12/2004 | Higgins | G08G 1/0175 348/149 |
| 2006/0001828 A1 | * | 1/2006 | Duggan | G02C 7/021 351/159.69 |

(Continued)

OTHER PUBLICATIONS

Shantharam et al., "Towards the Development of Secure MAVs Active Noise Control Systems View project Voice activated MAV View project Towards the Development of Secure MAVs," XP55490029, ICRAMAV 2014, 3 International Conference, Nov. 7, 2014, 6 pages.

(Continued)

*Primary Examiner* — Thomas G Black
*Assistant Examiner* — Sze-Hon Kong
(74) *Attorney, Agent, or Firm* — Fish & Richardson P.C.

(57) ABSTRACT

Systems, methods, and software can be used to identify a sensor on an autopilot vehicle. In some aspects, a video frame that is captured by a lens coupled to a vehicle is received. The video frame is determined to include an identifier of the lens. In response to determining that the video frame includes the identifier of the lens, the video frame is transmitted to an autopilot processor.

15 Claims, 2 Drawing Sheets

(56) References Cited

U.S. PATENT DOCUMENTS

| | | | |
|---|---|---|---|
| 2007/0147815 A1* | 6/2007 | Tanaka | G03B 17/14 396/56 |
| 2007/0171526 A1* | 7/2007 | Feron | G01S 1/70 359/470 |
| 2008/0130959 A1* | 6/2008 | Kim | G06F 21/32 382/117 |
| 2009/0316028 A1* | 12/2009 | Liu | H01L 27/14621 348/294 |
| 2010/0178614 A1* | 7/2010 | Hwang | G02B 3/0018 430/321 |
| 2011/0240739 A1* | 10/2011 | Delaigle | G06K 19/06037 235/454 |
| 2012/0019640 A1* | 1/2012 | Choudury | H04N 5/2251 348/61 |
| 2012/0162145 A1* | 6/2012 | Knee | G06K 17/0025 345/179 |
| 2013/0094789 A1* | 4/2013 | Hoffman | B65D 33/04 383/106 |
| 2013/0314582 A1* | 11/2013 | Masser | H04N 5/2254 348/340 |
| 2014/0002676 A1* | 1/2014 | Ning | G02B 7/14 348/187 |
| 2016/0236621 A1* | 8/2016 | Haler | B60R 1/12 |
| 2018/0029402 A1* | 2/2018 | Dhome | B42D 25/36 |
| 2018/0105184 A1* | 4/2018 | Urano | B60K 31/0008 |
| 2018/0112978 A1* | 4/2018 | Burton | G06T 7/579 |
| 2018/0137596 A1* | 5/2018 | Chenu | B61L 15/0027 |
| 2018/0174007 A1* | 6/2018 | Imamura | B23K 26/3576 |
| 2018/0338076 A1* | 11/2018 | Barros | |

OTHER PUBLICATIONS

Li, "Source Camera Identification Using Enhanced Sensor Pattern Noise," XP011306394, IEEE Transactions on Information Foresnics and Security, IEEE, Piscataway, NJ, US, vol. 5, No. 2, Jun. 1, 2010, 8 pages.

Hu et al., "Using improved imaging sensor pattern noise for source camera identification," XP031761298, Multimedia and Expo (ICME), 2010 IEEE International Conference on IEEE, Jul. 19, 2010, 6 pages.

Extended European Search Report issued in European Application No. 18157457.5 dated Jul. 16, 2018, 8 pages.

* cited by examiner

IDENTIFYING A SENSOR IN AN AUTOPILOT VEHICLE

TECHNICAL FIELD

The present disclosure relates to identifying a sensor in an autopilot vehicle.

BACKGROUND

In some cases, a vehicle may be controlled by an autopilot processing platform. The autopilot processing platform may generate autopilot commands. These autopilot commands are directed to components of the vehicle to control the movements of the vehicle. Examples of the components include steering wheel, brakes, accelarator, light, and the like. Examples of the autopilot commands include accelerate, decelerate, turn left or right, signal, and the like. A vehicle equiped with the autopilot processing platform can be referred to as a self-driving vehicle, a driver-less vehicle, an autonomous or semi-autonomous vehicle, or an autopilot vehicle.

DESCRIPTION OF DRAWINGS

Like reference numbers and designations in the various drawings indicate like elements.

DETAILED DESCRIPTION

In some cases, the autopilot processing platform receives inputs from one or more sensors installed on the vehicle. The one or more sensors may generate video or audio inputs that reflect the surroundings of the vehicle. The autopilot processing platform may include one or more autopilot processors that generate autopilot commands based on these inputs. Examples of the sensors can include lenses, microphones, laser, radar, ultrasonic, light detection and ranging (LIDAR) or any other sensors.

In some cases, the security of the autopilot processing platform may be compromised because one of the sensors, or a communication path between one of the sensors and the autopilot processor is compromised. In one example, an attacker may switch a lens that captures video frames on a vehicle with a compromised lens. The attacker can control the video frames generated by the compromised lens and manipulate the inputs to the autopilot processor. In another example, the attacker can insert an attacking device on the transmission path between the sensor and the autopilot processor. The attacking device can intercept the video frame, modify or replace the video frame (e.g., with a video frame that is recorded previously), and forward the modified or replaced video frame to the autopilot processor.

Figure 1:
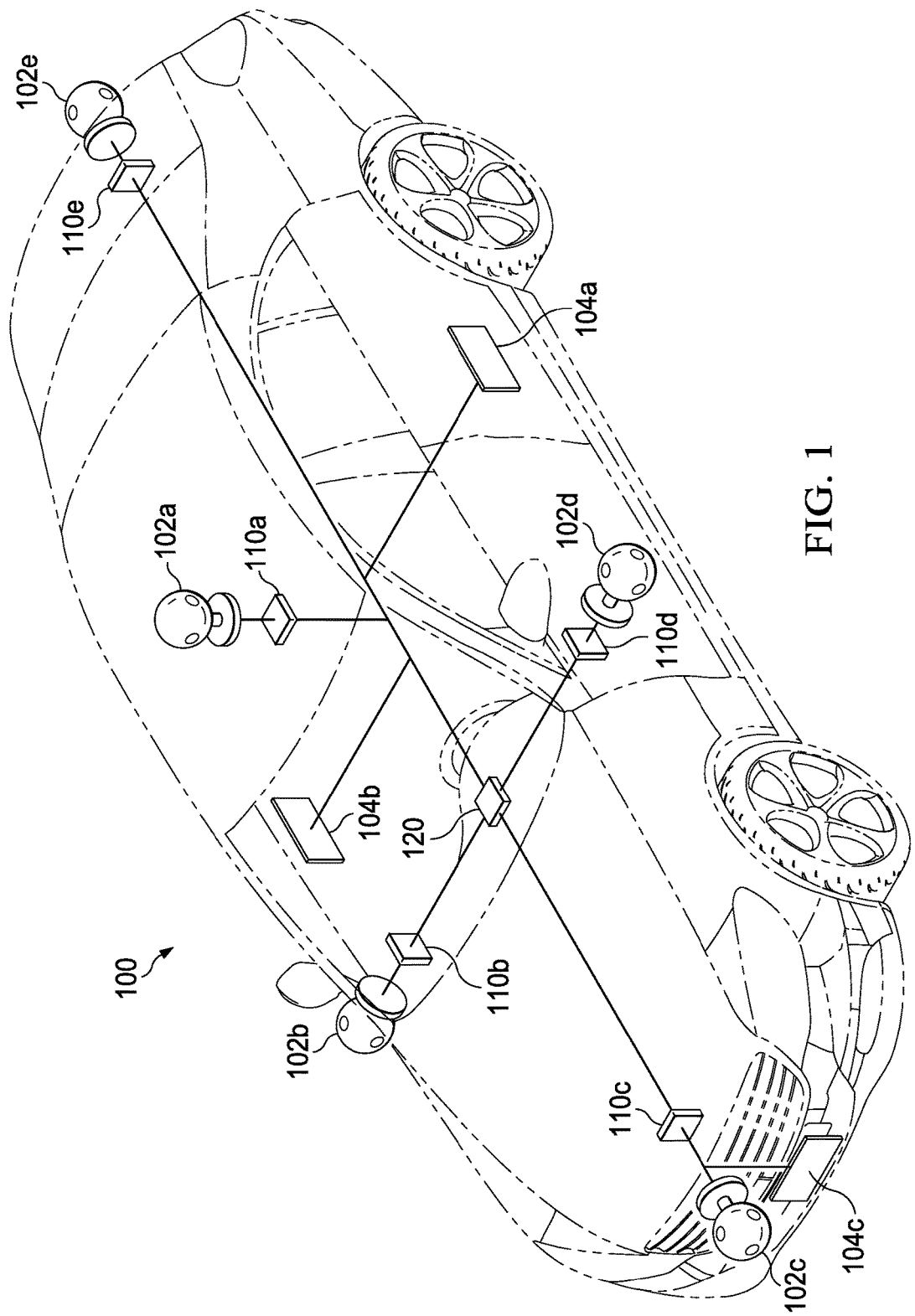
FIG. 1 is a schematic diagram showing an example vehicle installed with an autopilot processing platform, according to an implementation.
Figure 2:
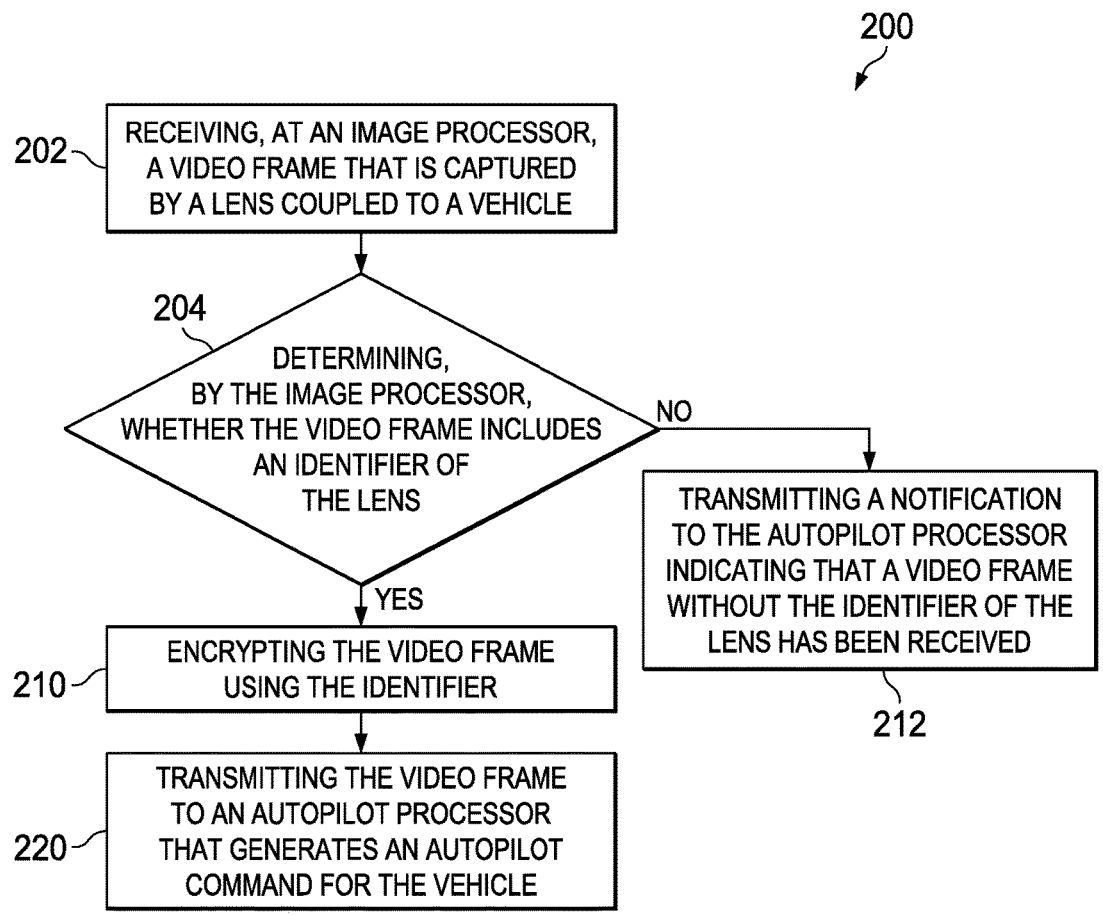
FIG. 2 is a flow diagram showing an example process for identifying a sensor in an autopilot vehicle, according to an implementation.
Figure 3:
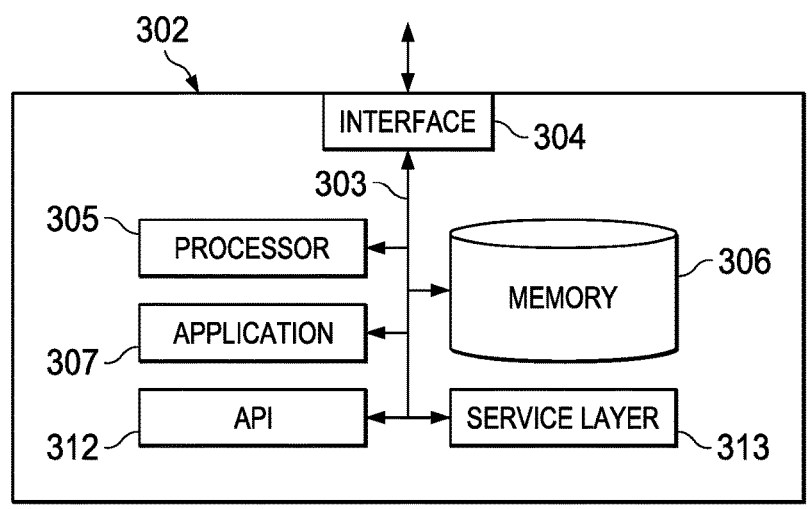
FIG. 3 is a high-level architecture block diagram showing an autopilot processing platform, according to an implementation.

In some cases, the video frame captured by the lens can include one or more micro marks that are used as an identifier of the lens. For example, the lens can be engraved with a micro pattern. The micro pattern can represent the identifier of the lens. Every video frame captured by the lens can be authenticated based on the presence of the micro pattern. The micro pattern can be engraved using microdots that are invisible to the naked eye but detectable by an image processor. If the lens is compromised, or if the communication path between the lens and the image processor is compromised, the video frame received by the image processor may not include the micro pattern, which will be detected by the image processor. The image processor can send a notification to the autopilot processor. The autopilot processor can take cautionary actions accordingly. If a lens is replaced with a new lens, the identifier of the new lens can be programmed into the image processor for detection. FIGS. 1-3 and associated descriptions provide additional details of these implementations.

FIG. 1 is a schematic diagram showing an example vehicle 100 installed with an autopilot processing platform, according to an implementation. The example vehicle 100 can represent a motor vehicle, e.g., an automobile, a car, a truck, a bus, a motorcycles, or the like, an aircraft, e.g., an airplanes, an unmanned aerial vehicle, an unmanned aircraft system, a drone, a helicopter, or the like, a spacecraft, e.g., a spaceplane, a space shuttle, a space capsule, a space station, a satellite, or the like, a watercraft, e.g., a ship, a boat, a hovercraft, a submarine, or like, a railed vehicle, e.g., a train, a tram, or the like, or any other type of vehicle including any combinations of any of the foregoing, whether currently existing or after arising.

The vehicle 100 includes lenses 102a-e that are communicatively coupled with the image processors 110a-e. The vehicle 100 also includes an autopilot processor 120 that are communicatively coupled with the image processors 110a-e and other sensors 104a-c.

The vehicle 100 includes lenses 102a-e that capture video frames. Each of the lenses 102a-e includes a piece of transparent material that can be penetrable by optical rays. Each of the lenses 102a-e also includes an image capturing component that captures the optical rays penetrating the piece of transparent material. Examples of the image capturing component include charge-coupled device (CCD), infra-red sensing device, and the like. In some cases, a lens, e.g., the lenses 102a-e, can point to one direction and capture the video frames towards the one direction. Alternatively or in combination, the lens can rotate to more than one direction and capture the video frames from more than one directions. The lenses 102a-e can be installed outside or inside of the vehicle 100. In some cases, one or more lenses 102a-e may be installed behind the windshield or one of the glasses of the vehicle 100.

In some cases, each of the lenses 102a-e can be coupled with a pre-processor. The pre-processor is a circuit that performs the analog-to-digital processing. The pre-processor can convert the video frames captured by the lenses 102a-e from the analog format to the digital format.

The vehicle 100 includes other sensors 104a-c. The other sensors 104a-c can include microphones, laser, radar, or any other sensors that capture environmental inputs for making autopilot commands.

The vehicle 100 includes image processors 110a-e. Each of the image processors 110a-e is coupled with a respective lens, e.g., one of the lenses 102a-e. An image processor, e.g., image processors 110a-e, include a specialized digital signal processor (DSP) used to process digital video frames received from a lens and the associated pre-processor. The image processor can also include computer-readable medium storing programming instructions that can be executed by the DSP to perform image processing functions. Examples of the image processing functions include Bayer transformation, demosaicing, noise reduction, image sharpening, or other image processing functions. In some cases, the image processor can also detect graphical information components from the video frames, e.g., background objects, from the video frames. The image processor can filter out these components out and keep the salient objects that are more relevant in making autopilot decisions. In some cases, the image processor can detect the presence of specific graphical information components, e.g., traffic light or road signs, in the video frames, and generate indications that indicate the presence of these specific components and their characteristics, e.g., the color of the traffic light or the number of the speed limit, and transmit the indications to the autopilot processor 120.

In some cases, instead of having an image processor for one lens, the vehicle 100 can include one image processor that processes the video frames from more than one lenses. For example, the vehicle 100 can include an image processor that can be configured to process video frames from the lenses 102a-e and transmit the processed video frames to the autopilot processor 120.

The autopilot processor 120 is a processor that generates autopilot commands based on inputs from the image processor 110a-e and the other sensors 104a-c. The autopilot processor 120 can be implemented on an autopilot processing platform that includes memory and other components. FIG. 3 and associated descriptions provide additional details of these implementations.

In some cases, the lenses 102a-e can be engraved with micro patterns that represent identifiers of the respective lens. In operation, the lenses 102a-e capture video frames and transmit the video frames to the image processors 110a-e. The image processors 110a-e determine whether the video frames include an identifier of the respective lens. If the video frames include the identifier of the lens, the image processors 110a-e process the video frames and transmit the processed video frames to the autopilot processor 120. If the video frames do not include the identifier of the lens, the image processors 110a-e generate a notification indicating that a video frame without the identifier of the lens has been received, and transmit the notification to the autopilot processor 120. FIGS. 1-3 and associated descriptions provide additional details of these implementations.

While elements of FIG. 1 are shown as including various component parts, portions, or modules that implement the various features and functionality, nevertheless, these elements may, instead, include a number of sub-modules, third-party services, components, libraries, and such, as appropriate. Furthermore, the features and functionality of various components can be combined into fewer components, as appropriate.

FIG. 2 is a flow diagram showing an example process 200 for identifying a sensor in an autopilot vehicle, according to an implementation. The process 200 can be implemented by an image processor, e.g., the image processors 110a-e shown in FIG. 1. The process 200 shown in FIG. 2 can also be implemented using additional, fewer, or different entities. Furthermore, the process 200 shown in FIG. 2 can also be implemented using additional, fewer, or different operations, which can be performed in the order shown or in a different order. In some instances, an operation or a group of operations can be iterated or repeated, for example, for a specified number of iterations or until a terminating condition is reached.

The example process 200 begins at 202, where a video frame is received at an image processor. The video frame is captured by a lens coupled to a vehicle. In some cases, more than one lens can be installed on the vehicle, where each lens can capture frames of scenes from a respective direction outside of the vehicle. In some cases, the lens can capture live shots at a configured periodicity.

In some cases, the video frame can be captured in an analog format. In one example, a charge-coupled device (CCD) image sensor can be used to convert the optical rays received through the lens into electron charges at the semiconductor-oxide interface and read out as analog signals.

In some cases, the lens is engraved with a micro pattern. The micro pattern can indicate an identifier of the lens. The micro pattern can be engraved on the front or back surface of the lens. The micro pattern can be engraved using laser, nanotechnology, or any other techniques that can be used to engrave patterns on a micro scale. The micro pattern can be composed of a group of microdots. Each microdot has a dimension that is small enough to be invisible to the naked eye. For example, the microdot can have a dimeter on the order of tens of micrometers to several hundreds of nanometers. The microdot can be even smaller if nanotechnology is used. In some cases, the microdots can be arranged in a pattern, e.g., a 2-dimensional (2D) pattern that represents an identifier. Alternatively, the micro pattern can include one or more symbols, e.g., letters of the English alphabet or any other language, digits 0-9, mathematical operators, or any other symbols that can be used to represent an identifier.

Because the lens is engraved with the micro pattern, when a video frame is captured through the lens, the video frame includes the micro pattern. In some cases, the lens can be placed inside of the vehicle next to a glass, e.g., a windshield or a window. In these or other cases, the glass can be engraved with microdots instead of the lens. Because the optical rays pass through both the glass and the lens before being captured into the video frame, the video frame will also include the micro pattern.

In some cases, after the video frame is captured by the lens, the video frame is transmitted to a pre-processor. The pre-processor converts the video frame in the analog format to a digital format. After converting, the per-processor transmits the video frame to the image processor.

At 204, the image processor determines whether the video frame includes an identifier of the lens. In some cases, the micro pattern of the lens is stored in a memory of the image processor. The image processor can process the received video frame and determine whether the video frame includes the micro pattern. In some implementations, raw data pattern analysis can be used. The image processor can extract or search the stored micro pattern. Additionally or alternatively, the micro pattern can be a barcode or a Quick Response (QR) code, and barcode or QR code detection can be used.

If the micro pattern is included in the video frame, the image processor determines that the video frame includes the identifier of the lens and therefore is authentic. In this case, the process 200 proceeds from 204 to 210, where the video frame is encrypted. In some cases, the video frame can be encrypted using the identifier of the lens as an input. For example, the identifier can be converted to a binary number that can be used as a key for encryption, or as a seed that generates a random string for encryption.

From 210, the process 200 proceeds to 220, where the encrypted video frame is transmitted to an autopilot processor. In some cases, the video frame can be transmitted to the autopilot processor without the encryption. For example, in some cases, the image processor is implemented on the same hardware platform as the autopilot processor, e.g., on the same circuit board. In these cases, the transmission path between the image processor and the autopilot processor is short and secure, and therefore the video frame may not be encrypted before transmission. Alternatively, the image processor and autopilot processor may be implemented in a different area of the vehicle. The transmission path between the image process and the autopilot processor can be implemented using wireless communication technologies, e.g., Near Field Communication (NFC), infrared, wireless local area network (WLAN or WiFi), Bluetooth, or the like, or wireline communication technologies, e.g., twisted pair cables, optical cables, or the like. In these or other cases, the video frame may be encrypted to prevent malicious attacks from manipulating the video frames.

The autopilot processor receives the video frame, decrypts the video frame if the video frame is encrypted, and analyzes the video frame to determine the environmental information surrounding the vehicle. The autopilot processor can generate autopilot commands for the vehicle based on analysis of the video frame.

If the micro pattern is not included in the video frame, the image processor determines that the video frame does not include the identifier of the lens, which means that the video frame may be distorted or replaced by malicious attackers. In this case, the process 200 proceeds from 204 to 212, where the image processor transmits a notification to the autopilot processor. The notification indicates that a video frame without the identifier of the lens has been received. In some cases, the notification can be encrypted. In some cases, the notification can be encrypted using a key associated with the image processor or the autopilot processor.

In some cases, after the autopilot processor receives the notification, the autopilot processor can generate an output on a user interface, indicating that the lens has been compromised. The autopilot processor can continue to generate autopilot commands using information received from other lens and sensors. Alternatively or in combination, the autopilot processor can terminate the auto-piloting process, request switching to manual pilot, slow down and stop the vehicle, or any combinations thereof.

In some cases, the image processor may make an error in determining that the video frame does not include the micro pattern. To prevent unnecessary reactions from the autopilot processor due to processing errors, the autopilot processor can determine that the lens is compromised after the number of consecutive notifications received exceeds a threshold. In one implementation, an error frame counter can be configured. The counter can be initialized to a configured threshold. In response to receiving the notification, the counter begins to count down. The counter continues to count down each time a consecutive notification is received. If a valid video frame is received before the counter reaches zero, the counter is reset to the configured threshold. If the counter reaches zero, the autopilot processor can determine that the lens is compromised. The autopilot processor can generate an output on a user interface indicating that the lens has been compromised, terminate the auto-piloting process, request switching to manual pilot, slow down and stop the vehicle, or any combinations thereof.

FIG. 3 is a high-level architecture block diagram showing an autopilot processing platform 302 according to an implementation. The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The autopilot processing platform 302 includes a computing system configured to perform the algorithm described in this disclosure to generate autopilot commands. In some cases, the algorithm can be implemented in an executable computing code, e.g., C/C++ executable codes. Alternatively or in combination, the algorithm can be implemented in an application program, e.g., EXCEL. In some cases, the platform 302 can include a standalone Linux system that runs batch applications. In some cases, the platform 302 can include mobile or personal computers that run the application program.

The platform 302 may include an input device, such as a keypad, keyboard, touch screen, microphone, speech recognition device, or another device that can accept user information, and/or an output device that conveys information associated with the operation of the platform 302, including digital data, visual and/or audio information, or a GUI.

At a high level, the platform 302 is an electronic computing device operable to receive, transmit, process, store, or manage data and information. According to some implementations, the platform 302 may also include or be communicably coupled with an application server, e-mail server, web server, caching server, streaming data server, business intelligence (BI) server, and/or other server.

The platform 302 can receive inputs from lenses and other senses that capture environmental information surrounding the vehicle for making autopilot decisions. In addition, requests may also be sent to the platform 302 from internal users (e.g., from a command console or by another appropriate access method), external or third parties, other automated applications, as well as any other appropriate entities, individuals, systems, or computers.

Each of the components of the platform 302 can communicate using a system bus 303. In some implementations, any and/or all the components of the platform 302, both hardware and/or software, may interface with each other and/or the interface 304 over the system bus 303, using an application programming interface (API) 312 and/or a service layer 313. The API 312 may include specifications for routines, data structures, and object classes. The API 312 may be either computer language-independent or -dependent and refer to a complete interface, a single function, or even a set of APIs. The service layer 313 provides software services to the platform 302. The functionality of the platform 302 may be accessible for all service consumers using this service layer. Software services, such as those provided by the service layer 313, provide reusable, defined business functionalities through a defined interface. For example, the interface may be software written in JAVA, C++, or other suitable language providing data in Extensible Markup Language (XML) format or other suitable format. While illustrated as an integrated component of the platform 302, alternative implementations may illustrate the API 312 and/or the service layer 313 as stand-alone components in relation to other components of the platform 302. Moreover, any or all parts of the API 312 and/or the service layer 313 may be implemented as child or sub-modules of another software module, enterprise application, or hardware module, without departing from the scope of this disclosure.

The platform 302 includes an interface 304. Although illustrated as a single interface 304 in FIG. 3, two or more interfaces 304 may be used according to particular needs, desires, or particular implementations of the platform 302. The interface 304 is used by the platform 302 for communicating with other components connected to the platform 302—(whether illustrated or not). Generally, the interface 304 comprises logic encoded in software and/or hardware in a suitable combination and operable to communicate with other components connected with the platform 302. More specifically, the interface 304 may comprise software supporting one or more communication protocols associated with communications such that the other components connected with the platform 302 or interface's hardware is operable to communicate physical signals.

The platform 302 includes a processor 305. Although illustrated as a single processor 305 in FIG. 3, two or more processors may be used according to particular needs, desires, or particular implementations of the platform 302. Generally, the processor 305 executes instructions and manipulates data to perform the operations of the platform 302. Specifically, the processor 305 executes the functionality required for provisioning enterprise services. In some cases, the processor 305 can include a data processing apparatus.

The platform 302 also includes a memory 306 that holds data for the platform 302. Although illustrated as a single memory 306 in FIG. 3, two or more memories may be used according to particular needs, desires, or particular implementations of the platform 302. While memory 306 is illustrated as an integral component of the platform 302, in alternative implementations, memory 306 can be external to the platform 302.

The application 307 is an algorithmic software engine providing functionality according to particular needs, desires, or particular implementations of the platform 302, particularly with respect to functionality required for provisioning enterprise service. Although illustrated as a single application 307, the application 307 may be implemented as multiple applications 307 on the platform 302. In addition, although illustrated as integral to the platform 302, in alternative implementations, the application 307 can be external to the platform 302.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media, transitory or non-transitory, suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a transitory or non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

The invention claimed is:

1. A method, comprising:
receiving, at an image processor, a video frame that is captured by a lens coupled to a vehicle, wherein the video frame includes an image of a micro pattern that indicates an identifier of the lens, and the micro pattern is engraved on the lens or a glass that is coupled with the lens;
determining, by the image processor, that the video frame captured by the lens includes the identifier of the lens; and
in response to determining that the video frame includes the identifier of the lens, transmitting the video frame to an autopilot processor that generates an autopilot command for the vehicle.

2. The method of claim 1, wherein the micro pattern comprises micro dots arranged in a 2-dimensional (2D) pattern.

3. The method of claim 1, further comprising: prior to transmitting the video frame, encrypting the video frame using the identifier.

4. The method of claim 1, further comprising:
receiving, at the image processor, a second video frame;
determining, by the image processor, that the second video frame does not include the identifier of the lens; and
in response to determining that the second video frame does not includes the identifier of the lens, transmitting a notification to the autopilot processor indicating that a video frame without the identifier of the lens has been received.

5. The method of claim 1, wherein the method further comprises: removing the micro pattern from the video frame before transmitting the video frame to the autopilot processor.

6. A video image capturing system for a vehicle, comprising:
   a lens configured to capture a video frame, wherein the video frame includes an image of a micro pattern that indicates an identifier of the lens, and the micro pattern is engraved on the lens or a glass that is coupled with the lens;
   a pre-processor configured to convert the video frame from an analog format to a digital format; and
   an image processor configured to:
      determine that the video frame captured by the lens includes the identifier of the lens; and
      in response to determining that the video frame includes the identifier of the lens, transmit the video frame to an autopilot processor that generates an autopilot command for the vehicle.

7. The video image capturing system of claim 6, wherein the micro pattern comprises micro dots arranged in a 2-dimensional (2D) pattern.

8. The video image capturing system of claim 6, wherein the image processor is configured to: prior to transmitting the video frame, encrypt the video frame using the identifier.

9. The video image capturing system of claim 6, wherein the image processor is configured to:
   receive a second video frame;
   determine that the second video frame does not include the identifier of the lens; and
   in response to determining that the second video frame does not includes the identifier of the lens, transmit a notification to the autopilot processor indicating that a video frame without the identifier of the lens has been received.

10. The video image capturing system of claim 6, wherein the image processor is configured to: remove the micro pattern from the video frame before transmitting the video frame to the autopilot processor.

11. A vehicle having an autopilot system, comprising:
   a lens configured to capture a video frame, wherein the video frame includes an image of a micro pattern that indicates an identifier of the lens, and the micro pattern is engraved on the lens or a glass that is coupled with the lens;
   a pre-processor configured to convert the video frame from an analog format to a digital format;
   an image processor configured to:
      determine that the video frame captured by the lens includes the identifier of the lens; and
      in response to determining that the video frame includes the identifier of the lens, transmit the video frame to an autopilot processor; and
   the autopilot processor communicatively coupled with a memory and configured to:
      receive the video frame; and
      generate an autopilot command for the vehicle.

12. The vehicle of claim 11, wherein the autopilot command comprises at least one of an acceleration command or a deceleration command.

13. The vehicle of claim 11, wherein the micro pattern comprises micro dots arranged in a 2-dimensional (2D) pattern.

14. The vehicle of claim 11, wherein the image processor is configured to: prior to transmitting the video frame, encrypt the video frame using the identifier.

15. The vehicle of claim 11, wherein
   the image processor is configured to:
      receive a second video frame;
      determine that the second video frame does not include the identifier of the lens; and
      in response to determining that the second video frame does not includes the identifier of the lens, transmit a notification to the autopilot processor indicating that a video frame without the identifier of the lens has been received; and
   the autopilot processor is configured to:
      receive the notification; and
      in response to receiving the notification, releasing a control of an autopilot operation of the vehicle.

* * * * *